US008717642B2

(12) United States Patent
Chen et al.

(10) Patent No.: US 8,717,642 B2
(45) Date of Patent: May 6, 2014

(54) FLATBED SCANNER AND METHOD FOR CONTROLLING SAME

(75) Inventors: Chia-Fu Chen, New Taipei (TW); King-Lung Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 39 days.

(21) Appl. No.: 13/448,499

(22) Filed: Apr. 17, 2012

(65) Prior Publication Data

US 2012/0287485 A1    Nov. 15, 2012

(30) Foreign Application Priority Data

May 12, 2011    (TW) ............................ 100116618 A

(51) Int. Cl.
 H04N 1/04    (2006.01)
(52) U.S. Cl.
 USPC ............................ 358/497; 358/474; 358/486
(58) Field of Classification Search
 USPC ............................ 358/474, 486, 497, 496, 406
 See application file for complete search history.

(56) References Cited

U.S. PATENT DOCUMENTS

| | | | | |
|---|---|---|---|---|
| 5,410,347 A * | 4/1995 | Steinle et al. | ................. | 348/270 |
| 5,937,112 A * | 8/1999 | Herregods et al. | ............ | 382/319 |
| 6,037,584 A * | 3/2000 | Johnson et al. | ............... | 250/235 |
| 6,115,149 A * | 9/2000 | Lai et al. | ........................ | 358/505 |
| 6,178,015 B1 * | 1/2001 | Lee et al. | ....................... | 358/486 |
| 6,765,206 B2 * | 7/2004 | Sugiyama et al. | ............ | 250/330 |
| 7,397,587 B2 * | 7/2008 | Os et al. | ........................ | 358/474 |
| 7,477,425 B2 * | 1/2009 | Haas et al. | .................... | 358/474 |
| 7,527,264 B2 * | 5/2009 | Terada | .......................... | 271/274 |
| 7,729,020 B2 * | 6/2010 | Chien | .......................... | 358/497 |
| 8,014,046 B2 * | 9/2011 | Yoshihisa | ..................... | 358/496 |
| 8,218,183 B2 * | 7/2012 | Wang | .......................... | 358/1.15 |
| 8,422,087 B2 * | 4/2013 | Ogino | .......................... | 358/474 |
| 8,514,460 B2 * | 8/2013 | Miyagawa | .................... | 358/448 |
| 8,537,648 B1 * | 9/2013 | Lu et al. | ..................... | 369/44.28 |

* cited by examiner

Primary Examiner — Negussie Worku

(74) Attorney, Agent, or Firm — Novak Druce Connolly Bove + Quigg LLP

(57) ABSTRACT

A flatbed scanner includes a transparent window and an optical ruler close to the transparent window along a scanning direction. The optical ruler has at least one oblique line arranged thereon. The flatbed scanner includes a scanner head having a scanning width larger than the width of the transparent window for capturing an image of the optical ruler while the scanner head is being progressively moved by a step motor. The flatbed scanner further includes a processing unit for calculating a jag width of a captured oblique line in the captured image and a controlling unit for controlling the step motor to adjust the speed of movement of the scanner head according to the jag width of the captured oblique line.

14 Claims, 5 Drawing Sheets

US 8,717,642 B2

FLATBED SCANNER AND METHOD FOR CONTROLLING SAME

BACKGROUND

1. Technical Field

The disclosure generally relates to image processing apparatuses and methods for controlling image processing apparatuses, and particularly relates to flatbed scanners and methods for controlling flatbed scanners.

2. Description of Related Art

An image scanner can optically scan a picture, printed text, handwriting, or a document of any other type, and convert it to a digital image. Typically, the image scanners can be classified into flatbed scanners, feed-in scanners, and hand-held scanners. For a flatbed scanner, a document to be scanned is usually placed upside down on a transparent window, under which a scanner head having a plurality of image sensors is arranged. The scanner head may capture an image of the document while being driven to move step-by-step by a step motor. The speed of movement of the scanner head will significantly influence the quality of the scanned image. Therefore, there is a need for a technique for controlling the step motor to drive the scanner head to move at an appropriate speed to generate images with high quality.

BRIEF DESCRIPTION OF THE DRAWINGS

Many aspects of the embodiments can be better understood with reference to the following drawings. In the drawings, the emphasis is placed upon clearly illustrating the principles of the embodiments.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references can mean "at least one."

In general, the word "module," as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
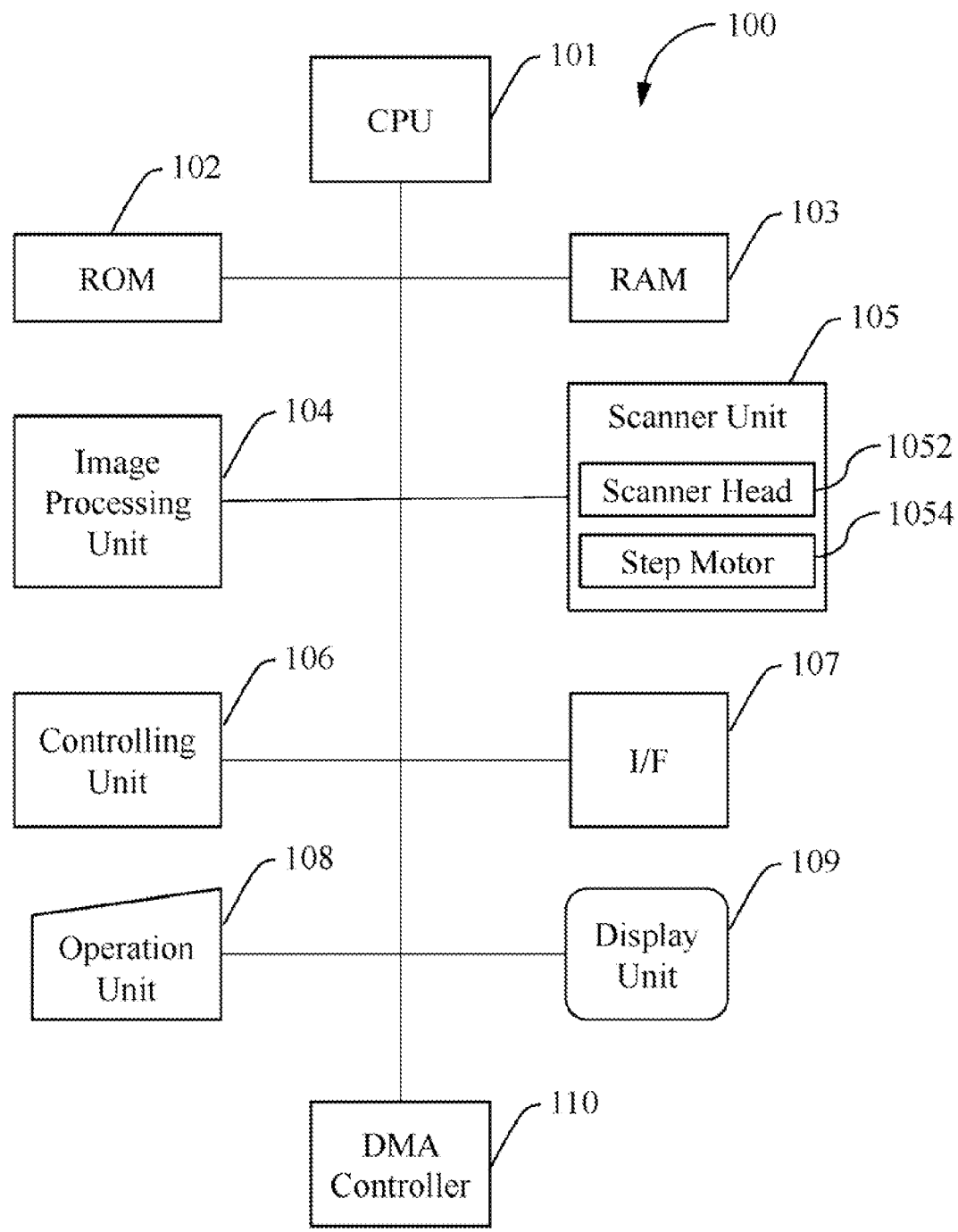
FIG. 1 is a functional block diagram of a flatbed scanner as an example of an image processing apparatus, according to one embodiment.

FIG. 1 is a functional block diagram of a flatbed scanner 100, which is an example of an image processing apparatus according to one embodiment. The flatbed scanner 100 includes a central processing unit (CPU) 101, a read-only memory (ROM) 102, a random-access memory (RAM) 103, an image processing unit 104, a scanner unit 105, a controlling unit 106, an interface (I/F) 107, an operation unit 108, a display unit 109, and a direct memory access (DMA) controller 110.

The CPU 101 is a processor for controlling the flatbed scanner 100 overall. The flatbed scanner 100 is controlled by running one or more executable software programs (or firmware) stored in the ROM 102.

The ROM 102 is non-volatile memory that stores the one or more programs for controlling the flatbed scanner 100.

The RAM 103 is volatile memory which is used as a working area when the CPU 101 runs the one or more programs stored in the ROM 102. The RAM 103 is also used as buffer memory for temporarily storing image data received from the scanner unit 105.

The image processing unit 104 may perform digital image processing such as color correction, filter processing and optical character recognition on image data, such image data having first been buffered in the RAM 103 by the scanner unit 105.

The scanner unit 105 may scan a sheet of paper, a plastic sheet, a film, and the like (hereinafter referred to generically as "scanned document"), and generate image data. The scanner unit 105 temporarily buffers, in the RAM 103, image data that has been generated by scanning an image.

Figure 2:
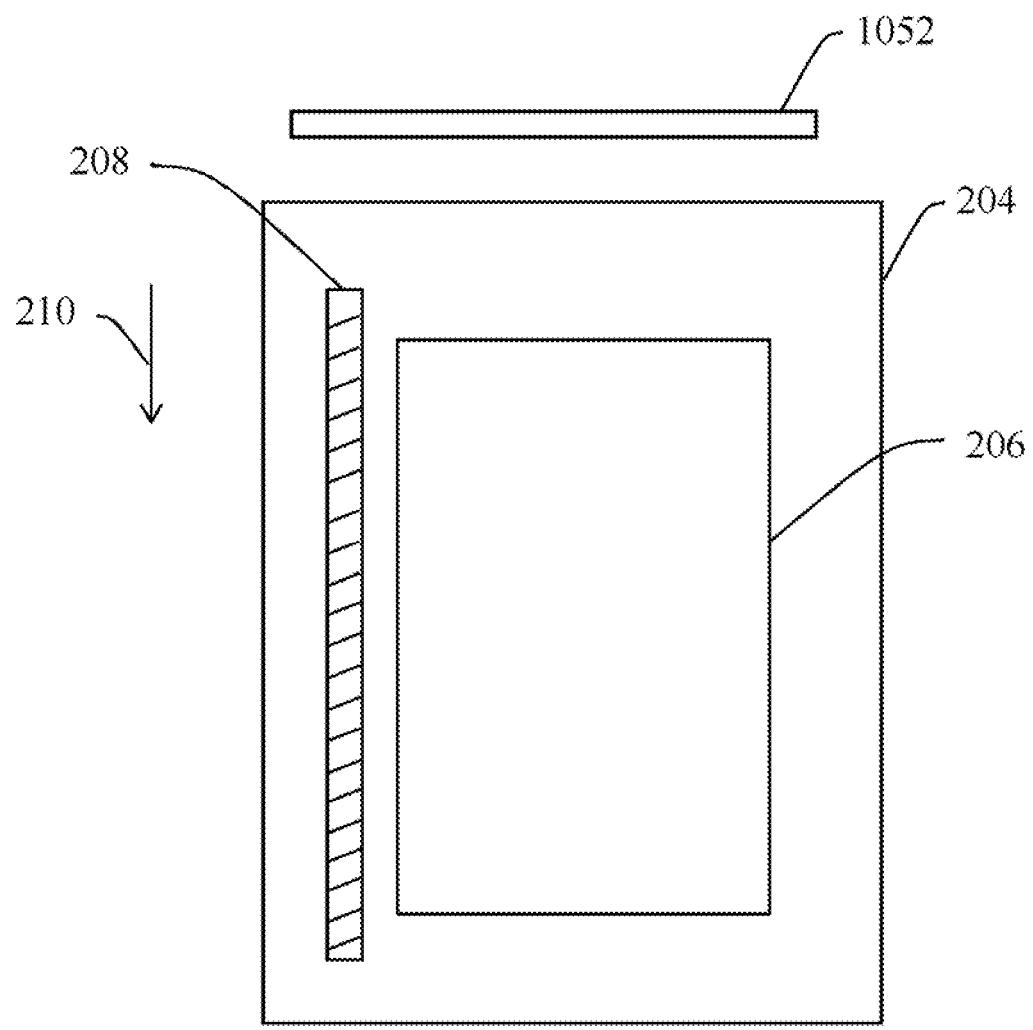
FIG. 2 is a schematic diagram showing an optical ruler provided on the back surface side of the top housing of the flatbed scanner of FIG. 1.

The scanner unit 105 may include a scanner head 1052, which is arranged under a transparent window 206 as shown in FIG. 2. The width of the scanner head 1052 is obviously larger than the width of the transparent window 206. A plurality of charge-coupled devices (CCDs) or CMOS image sensors (CISs) may be arranged in the scanner head 1052, in a line along the scanning width direction. Image data is obtained by the CCDs detecting light reflected from the image which is converted into electrical signals. Further, the scanner head 1052 may be mechanically moved along a linear direction in stepwise fashion by a step motor 1054 with the linear direction of motion being perpendicular to the line of CCDs. The step motor 1054 is functionally controlled by the controlling unit 106. The entire image is scanned by a combination of the electrical scanning performed by the CCDs and the mechanical movement of the scanner head 1052. In this description, a direction of electrical scanning performed by the line of CCDs at any one time is called a "main scanning direction," and the direction of mechanical movement of the scanner head 1052 is called a "sub scanning direction."

Thus the scanner unit 105 may scan an image line-by-line, and may generate color image data. The color image data is image data in which color components including RGB (red, green, blue) components are represented in, for example, 8 bits (0 to 255 levels). The number of bits representing each pixel can be freely set within the range of the capability of the CCDs or CISs. The number of bits representing each pixel is called "color depth."

The controlling unit 106 may control the step motor 1054 to drive the scanner head 1052 to move at various speeds while a scanning process is being performed.

The I/F 107 allows the flatbed scanner 100 to communicate with various external devices. The external devices may include, for example, a personal computer (PC), or a drive for reading and writing data in a storage medium such as a memory card. The kinds of interfaces used for the I/F 107 may include Universal Serial Bus (USB) and IEEE (Institute of Electrical and Electronics Engineers) 1394.

The operation unit 108 may be operated by a user to provide the flatbed scanner 100 with various instructions. A possible instruction includes, for example, a scan instruction for the scanner unit 105 to perform scanning of a scanned document. The instruction to the flatbed scanner 100 may be provided from a PC or the like through the I/F 107.

The display unit 109 may notify the user of various information, and be made up of a liquid crystal display (LCD), a light emitting diode (LED) display, and the like. The information provided to the user includes, for example, a state of the flatbed scanner 100 (scanning or idling) and the settings menu of the flatbed scanner 100.

The DMA controller 110 is a controller for transferring data between the constituent elements of the flatbed scanner 100 through DMA transfer.

FIG. 2 illustrates an optical ruler 208 provided on the back surface side of a top housing 204 of the flatbed scanner 100. A scanned document may be put face down on the top of the transparent window 206, and the required side of the document can be viewed through the transparent window 206. The scanned document is scanned following the scanning direction 210. At least one optical oblique line is painted on the optical ruler 208. The background color of the optical ruler 208 is white and the foreground color of the optical oblique line is black.

In addition, the optical ruler 208 is allocated against the transparent window 206, but the calibrated image generated from the optical ruler 208 is not to appear in the scanned image of the scanned document. Accordingly, the width of the scanner head 1052 must be larger than the width of the transparent window 206. The scanner head 1052 may capture both the scanned image of the scanned document and the calibrated image of the optical ruler 208 while being driven by the step motor 1054.

Figure 3:
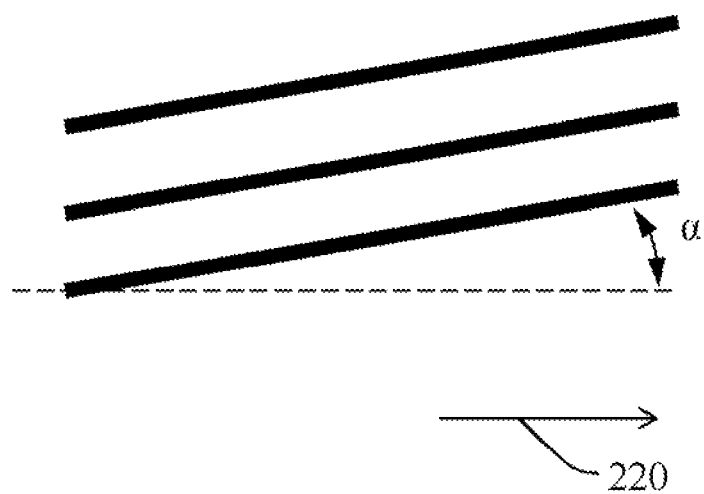
FIG. 3 is a partial enlarged view of the optical oblique lines painted on the optical ruler of FIG. 2.

According to some embodiments, the optical ruler 208 has a plurality of optical oblique lines arranged thereon. As shown in FIG. 3, the optical oblique lines are parallel to each other and have the same oblique angle α relative to a second direction 220 (landscape direction) perpendicular to the scanning direction 210. Thereby the optical oblique lines have the same slope relative to the second direction 220. The oblique angle α can be selected between 0 degree and 26.6 degree. According to one embodiment, the oblique angle α is selected as 5.71 degrees. When the oblique angle α is equal to 5.71 degrees, the slope of the optical line (equal to tan α) is 0.1 and the reciprocal of the slope (equal to 1/tan α) is 10, which is perfectly an integer.

Figure 4:
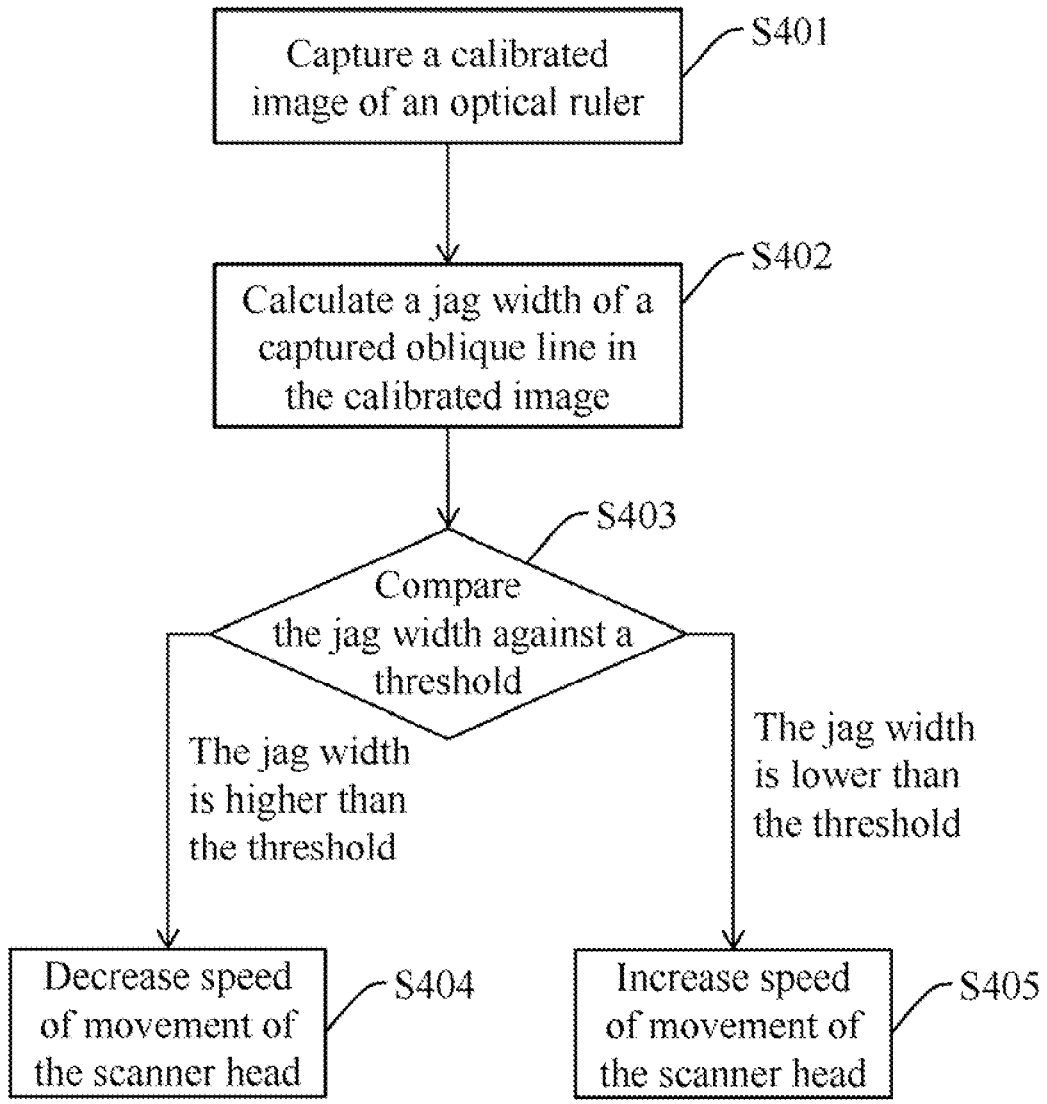
FIG. 4 is a flowchart showing a method for controlling the flatbed scanner of FIG. 1 according to one embodiment.

FIG. 4 is a flowchart showing a method for controlling the flatbed scanner 100 according to one embodiment. The method may include the following steps.

In step S401, the scanner head 1052 captures a calibrated image of the optical ruler 208 along with the scanned document while the scanner head 1052 is being progressively moved by the step motor 1054.

Figure 5:
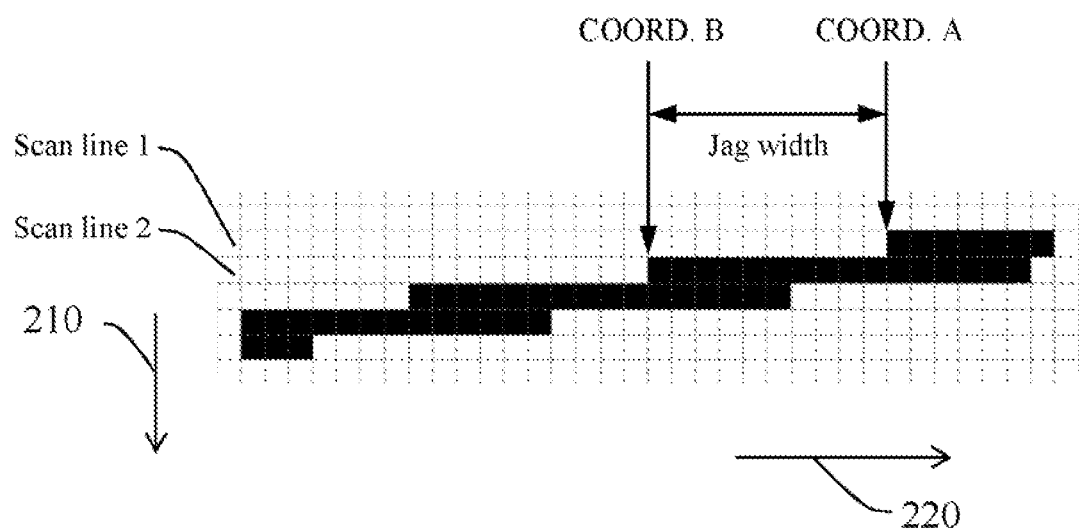
FIG. 5 is a partial view of a bitmap of the calibrated image generated from the optical ruler.

In step S402, the image processing unit 104 calculates a jag width of a captured oblique line in the calibrated image of the optical ruler. For the purposes of this disclosure, "jag width" means the distance from the front corner of one apparent step to the front corner of a next apparent step where a visually smooth line, or a length of it, becomes digitally represented as a progression of steps. FIG. 5 illustrates a portion of a bitmap of the calibrated image generated from the optical ruler 208, which is composed of a plurality of black pixels and white pixels. The image processing unit 104 firstly selects two adjacent scan lines (scan line 1 and scan line 2) in the bitmap of the calibrated image of the optical ruler. Then the image processing unit 104 identifies the first black pixel (coordinate point A) along the second direction 220 in the scan line 1 and the first black pixel (coordinate point B) along the second direction 220 in the scan line 2. The image processing unit 104 calculates the distance (measured in pixels) between the coordinate point A and the coordinate point B, which can be regarded as the jag width of the captured oblique line. For example, the jag width of the captured oblique line shown in FIG. 5 is 10 pixels.

In step S403, the controlling unit 106 compares the jag width against a pre-determined threshold. The pre-determined threshold may be determined according to the slope of the optical oblique line relative to the second direction 220. For example, the pre-determined threshold may be obtained by using the equation $p=1/\tan \alpha=1/s$, where p represents the predetermined threshold, α represents the oblique angle of the optical oblique line relative to the second direction 220, and s represents the slope of the optical oblique line relative to the second direction 220. If the jag width is higher than the pre-determined threshold, the flow goes to step S404. If the jag width is lower than the pre-determined threshold, the flow goes to step S405.

In step S404, the controlling unit 106 controls the step motor 1054 to decrease the speed of the movement of the scanner head 1052, for example, by ten percent.

In step S405, the controlling unit 106 controls the step motor 1054 to increase the speed of the movement of the scanner head 1052 for example, by ten percent.

After the speed of movement of the scanner head 1052 is adjusted in step S404 or S405, the calibration process, set forth as above, will be performed again until an appropriate speed of movement of the scanner head 1052 is found, when the measured jag width is substantially equal to the pre-determined threshold. Thus a closed loop control is completed by adjusting the speed of movement of the scanner head 1052 according to the jag width of the captured oblique line in the calibrated image.

Although numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

In particular, depending on the embodiment, certain steps or methods described may be removed, others may be added, and the sequence of steps may be altered. The description and the claims drawn for or in relation to a method may include some indication in reference to certain steps. However, any indication used is only for illustrative purposes, and not as a suggestion as to a fixed order for the steps.

What is claimed is:

1. A flatbed scanner, comprising:
   a transparent window on a top housing of the flatbed scanner for placing a sheet;
   an optical ruler on a back surface side of the top housing and close to the transparent window along a scanning direction, the optical ruler comprising at least one optical oblique line arranged thereon;
   a step motor;
   a scanner head having a scanning width larger than a width of the transparent window, the scanner head is configured to capture an image of the optical ruler along with the sheet while the scanner head is being progressively moved by the step motor;
   a processing unit configured to calculate a jag width of a captured oblique line in the captured image, wherein the jag width represents a distance from a front corner of one apparent step to another front corner of a next apparent step of the captured oblique line; and a controlling unit configured to control the step motor to adjust a speed of movement of the scanner head according to the jag width of the captured oblique line.

2. The flatbed scanner of claim 1, wherein the controlling unit is configured to control the step motor to increase the speed of the movement of the scanner head when the jag width of captured oblique line is lower than a pre-determined threshold value, and to control the step motor to decrease the speed of the movement of the scanner head when the jag width of the captured oblique line is higher than the pre-determined threshold value.

3. The flatbed scanner of claim 2, wherein the pre-determined threshold value is equal to a reciprocal of a slope of the at least one optical oblique line relative to a second direction perpendicular to the scanning direction.

4. The flatbed scanner of claim 3, wherein an oblique angle of the at least one optical oblique line relative to the second direction is between 0 degree and 26.6 degree.

5. The flatbed scanner of claim 4, wherein the oblique angle of the at least one optical oblique line relative to the second direction is equal to 5.71 degree.

6. The flatbed scanner of claim 1, wherein a background color of the optical ruler is white and a fore color of the at least one optical oblique line is black.

7. The flatbed scanner of claim 1, wherein the optical ruler comprises a plurality of optical oblique lines, each of the plurality of optical oblique lines is parallel to each other and has an identical slope relative to a second direction perpendicular to the scanning direction.

8. A method for controlling a flatbed scanner, the flatbed scanner having a transparent window on a top housing thereof for placing a sheet, a step motor, and a scanner head having a scanning width larger than a width of the transparent window, the method comprising:

providing an optical ruler on a back surface side of the top housing and close to the transparent window along a scanning direction, the optical ruler having at least one optical oblique line arranged thereon;

capturing an image of the optical ruler along with the sheet while the scanner head is being progressively moved by the step motor;

calculating a jag width of a captured oblique line in the captured image, wherein the jag width represents a distance from a front corner of one apparent step to another front corner of a next apparent step of the captured oblique line; and controlling the step motor to adjust a speed of movement of the scanner head according to the jag width of the captured oblique line.

9. The method of claim 8, wherein the controlling comprises controlling the step motor to increase the speed of the movement of the scanner head when the jag width of captured oblique line is lower than a pre-determined threshold value, and controlling the step motor to decrease the speed of the movement of the scanner head when the jag width of the captured oblique line is higher than a pre-determined threshold value.

10. The method of claim 9, wherein the pre-determined threshold value is equal to a reciprocal of a slope of the at least one optical oblique line relative to a second direction perpendicular to the scanning direction.

11. The method of claim 10, wherein an oblique angle of the at least one optical oblique line relative to the second direction is between 0 degree and 26.6 degree.

12. The method of claim 11, wherein the oblique angle of the at least one optical oblique line relative to the second direction is equal to 5.71 degree.

13. The method of claim 8, wherein a background color of the optical ruler is white and a fore color of the at least one optical oblique line is black.

14. The method of claim 8, wherein the optical ruler comprises a plurality of optical oblique lines, each of the plurality of optical oblique lines is parallel to each other and has an identical slope relative to a second direction perpendicular to the scanning direction.

\* \* \* \* \*